US008219359B2

(12) United States Patent
Baba

(10) Patent No.: US 8,219,359 B2
(45) Date of Patent: Jul. 10, 2012

(54) PERFORMANCE EVALUATING APPARATUS

(75) Inventor: Teruyuki Baba, Tokyo (JP)

(73) Assignee: NEC Corporation, Tokyo (JP)

( * ) Notice: Subject to any disclaimer, the term of this patent is extended or adjusted under 35 U.S.C. 154(b) by 341 days.

(21) Appl. No.: 12/457,869

(22) Filed: Jun. 24, 2009

(65) Prior Publication Data

US 2009/0326869 A1    Dec. 31, 2009

(30) Foreign Application Priority Data

Jun. 25, 2008    (JP) ................ 2008-165305

(51) Int. Cl.
  *G06F 11/30* (2006.01)
  *G06F 9/46* (2006.01)
(52) U.S. Cl. ............................. 702/186; 718/105
(58) Field of Classification Search .......... 702/186; 718/105
  See application file for complete search history.

(56) References Cited

U.S. PATENT DOCUMENTS 4,099,235 A * 7/1978 Hoschler et al. ............ 718/105

FOREIGN PATENT DOCUMENTS

| JP | 05-158740 | 6/1993 |
|---|---|---|
| JP | 09-081401 | 3/1997 |
| JP | 2000-298593 A | 10/2000 |
| JP | 2006-065430 A | 3/2006 |
| JP | 2006-185055 A | 7/2006 |

OTHER PUBLICATIONS

IBMSystems Magazine e-Newsletter Exclusive, Calculating CPU Utilization, Oct. 2002, www.ibmsystemsmag.com/ibmi/administrator/performance/Calculating-CPU-Utilization.*
A. Rikun et al., "Optimization with Service Level Objectives in Virtual Environment," Proceedings of Computer Measurement Group (CMG) Conference, 2006, pp. 1-12.
Kino Issei "Queuing network," Asakura Publishing Co., Ltd., Nov. 25, 2002, pp. 136-142.

* cited by examiner

*Primary Examiner* — Eliseo Ramos Feliciano
*Assistant Examiner* — L. Anderson
(74) *Attorney, Agent, or Firm* — Foley & Lardner LLP

(57) ABSTRACT

A performance evaluating apparatus includes a selector, a first performance value calculator, and a second performance value calculator. The first performance value calculator calculates a first performance value based on first partial process execution time tcpu in which a first processor performs a first partial process and a second partial process execution time tdisk in which a second processor performs a second partial process. The second performance value calculator calculates a second performance value based on the first partial process execution time and the predetermined upper limit executable time ratio $\alpha 1$. The selector selects either the first performance value or the second performance value as the performance value based on the upper limit executable time ratio, the first partial process execution time, and the second partial process execution time.

4 Claims, 13 Drawing Sheets

PERFORMANCE EVALUATING APPARATUS

This application is based upon and claims the benefit of priority from Japanese Patent Application No. 2008-165305 filed on Jun. 25, 2008, the content of which is incorporated by reference.

BACKGROUND OF THE INVENTION

1. Field of the Invention

The present invention relates to a performance evaluating apparatus for calculating a performance value representing the performance of an information processing apparatus for carrying out a processing operation.

2. Description of the Related Art

One example of time-sharing processing is a virtual machine technology for utilizing the central processing unit (CPU) of an information processing apparatus (computer) on a time-sharing basis. FIG. 1 of the accompanying drawings shows a system using a virtual machine by way of example. The virtual machine technology allows a plurality of operating systems (OS) to be time-shared by one CPU.

Each of the operating systems executed by the single CPU 211 is called a virtual machine (VM) 202a, 202b. Specifically, each virtual machine 202a, 202b is assigned the resources of physical machines such as memory 212, a disk 213, a network card (NIC) 214, etc. as well as the CPU 211, and can freely use the assigned resources. Therefore, each virtual machine can execute an OS (guest OS) 204a, 204b and application programs (applications) 203a, 203b as if it were a single physical machine.

The CPU 211 of the computer 201 which is time-shared by the virtual machines 202a, 202b is referred to as a physical CPU, and a virtual CPU that is assigned to each virtual machine is referred to as a virtual CPU. The virtual machine technology, including virtualization software 205, is used in the field of computer systems for better computer utilization and higher security between virtual machines.

A computer system based on virtual machine technology makes it possible to establish an upper limit for resources of a CPU (CPU utilization) that can be used by each virtual machine to thereby achieve independence between a plurality of virtual machines constructed on the physical CPU. For determining an upper limit for resources assigned to each virtual machine, there is a trade-off between the following two requirements:

The first requirement is a requirement for more virtual machines to be constructed on a physical machine to realize cost reduction. The second requirement is a requirement for sufficient resources to be given to each virtual machine to guarantee the performance of applications run on each virtual machine.

In order to determine minimum resources which meet demands for performance against the trade-off, a need arises for a performance evaluating apparatus to calculate a performance value representing the performance depending on resources assigned to each virtual machine.

A known performance evaluating apparatus will be described below.

Document "Kino Issei "Queuing network", Asakura Publishing Co., Ltd., Nov. 25, 2002, pp. 136 through 142" (hereinafter referred to as Document 1) discloses a performance evaluating apparatus which addresses ordinary computer systems, rather than virtual machines. Document 1 deals with a performance calculating method for an information processing apparatus having a CPU and a disk. However, an upper limit for CPU utilization is not established in the information processing apparatus.

According to the information processing apparatus, a queuing model is generated by regarding each CPU and each disk as a queue, and an average response time is calculated according to the queuing theory based on a CPU execution time (a time in which the CPU performs its processing operation) and a disk execution time (a time in which the disk (storage device) performs a storing process (writing process or reading process)).

The average response time represents the average value of a response time per job when a plurality of jobs are executed (a time consumed after the execution of one job is started until the execution of the job is completed and the execution of the next (other) job is started).

Document "Anatoliy Rikun, Yiping Ding "Optimization with Service Level Objectives in Virtual Environment" Proceedings of Computer Measurement Group (CMG) Conference, 2006" (hereinafter referred to as Document 2) discloses a performance evaluating apparatus for calculating a CPU execution time when an upper limit for CPU utilization is established. If the number of processes which a physical CPU can process per unit time is represented by $\mu$, and an upper limit for CPU utilization which is established with respect to a virtual machine is represented by $\alpha$ ($0<\alpha<1$), then the performance evaluating apparatus calculates an average response time according to the queuing theory by regarding the number of requests (the number of processes) which the virtual machine can process per unit time as $\alpha \cdot \mu$.

However, the above performance evaluating apparatus suffers a problem in that the calculated response time of the virtual machine tends to be larger than an actual value, i.e., the performance evaluating apparatus tends to estimate the performance as too low. This problem will be described in detail below.

An example in which an application for sequentially processing jobs, i.e., for performing a process, using a CPU and a disk is run on virtual machines will be described below. The average response time of the application is calculated as a performance value of the virtual machines. The sequential process refers to a process for waiting for one job to be finished and then performing the next job.

A system in which a physical CPU is shared by two virtual machines and which has a single disk will be described by way of example below. According to Document 1, the sequential process is expressed as a batch process, and is represented by a queuing model that is indicated by a closed system shown in FIG. 2 of the accompanying drawings.

In FIG. 2, the two virtual machines are expressed as independent queues. It is assumed that upper limits for CPU utilization which are assigned to the respective virtual machines are indicated by $\alpha 1$, $\alpha 2$ ($0<\alpha 1$, $0<\alpha 2$, $\alpha 1+\alpha 2 \leq 1$), respectively.

As described in Document 2, the processing capability of each virtual CPU is considered to be $\alpha 1$ times or $\alpha 2$ times the processing capability of the physical CPU. For calculating an average response time according to the above queuing model, the convolutional method disclosed in Document "To-shio Kameda, Ketsu Ri, Kino Issei "Basics and Applications of Performance Evaluation (Information Mathematics Lecture)", Kyoritsu Shuppan Co., Ltd., 1998, pp. 134 through 151" can be used.

FIG. 3 of the accompanying drawings shows measured values of the average response time and calculated values (estimated value) thereof which are produced by the above performance evaluating apparatus at the time an application for sequentially processing jobs wherein the average value of a CPU basic execution time per job is 0.134 second and the average value of a disk basic execution time is 0.939 second is run on virtual machine 1.

The CPU basic execution time refers to the execution time of a processing operation performed by the CPU in case where 100% of the processing capability of the physical CPU is utilized, and does not include queuing times according to other processes. The disk basic execution time refers to the execution time of a storing operation performed by the disk in case where 100% of the processing capability of the physical CPU is utilized, and does not include queuing times according to other processes.

If the upper limit for CPU utilization by a virtual machine is 10%, then the virtual machine is handled as a CPU having an ability to perform a 0.746 (=(1/0.134)×(1/10)) process in the queuing model.

To simplify calculations of the queue, it is assumed that the distribution of the execution times for the jobs is represented by an exponential distribution, and the response time is measured while virtual machine 2 does not execute the application.

The graph shown in FIG. 3 indicates how the average response time varies when the upper limit for CPU utilization by the virtual machine is changed. A comparison of the results indicates that if the upper limit for CPU utilization by a virtual machine is 10%, the calculated average response time is about twice the measured average response time.

If the performance value is estimated as too low when the system is designed, then since extra computer resources need to be provided, the cost of the system which is constructed is increased. Conversely, if the performance value is estimated as too high, then the performance value expected when the system is designed cannot be reached when the system is in actual operation.

The reason why the average response time calculated by the performance evaluating apparatus and the measured average response time are different from each other is that the operation of a virtual machine assumed by the performance evaluating apparatus is different form the operation of an actual virtual machine. Differences between the operation of a virtual machine assumed by the performance evaluating apparatus and the operation of an actual virtual machine will be described below.

As shown in FIGS. 4 and 5 of the accompanying drawings, an actual virtual machine uses 100% of the CPU power within an assigned time. If an upper limit $\alpha$ for CPU utilization is established for the virtual machine, then a time in which the virtual machine can perform a process using the CPU within a certain time T is limited to $\alpha \cdot T$.

In order to keep the upper limit for CPU utilization established for the virtual machine, a time is inserted in which the virtual machine cannot use the CPU. The time inserted for keeping the upper limit for CPU utilization will hereinafter be called idle time (waiting time) tidle. Idle time tidle has duration $(1-\alpha) \cdot T$.

If there are a plurality of virtual machines, then other virtual machines perform their processes using the CPU in idle time tidle. If a sequential process is performed, then since the CPU is not used while the disk is performing its storing operation, the disk execution time is included in idle time tidle.

If disk execution time tdisk is longer than idle time tidle (see FIG. 4), then CPU utilization is less than the upper limit because the CPU is not used longer than idle time tidle during the storing operation of the disk even though the processing operation of the CPU and the storing operation of the disk are repeatedly carried out. The response time of the process at this time is equal to the sum of the CPU execution time and the disk execution time, and does not depend on the upper limit for CPU utilization, i.e., idle time tidle.

If disk execution time tdisk is shorter than idle time tidle (see FIG. 5), then the storing operation of the disk is completed within idle time tidle. The response time at this time depends on the duration of idle time tidle, and varies in inverse proportion to the upper limit for CPU utilization.

The operation of the CPU assumed by the above performance evaluating apparatus is shown in FIG. 6 of the accompanying drawings.

If the upper limit for CPU utilization established for a virtual machine is represented by $\alpha(0<\alpha<1)$, then the performance evaluating apparatus assumes a CPU whose processing capability (CPU power) is equal to the processing capability (CPU power) of a physical CPU as it is reduced $\alpha$ times, as a virtual CPU. The execution time of a processing operation performed by the CPU is equal to $1/\alpha$ of the CPU execution time in case 100% of the CPU power is utilized. Therefore, a reduction in the value of $\alpha$ results in an increase in the CPU execution time. The execution time of a storing operation performed by the disk does not vary depending on the CPU power.

Inasmuch as the above performance evaluating apparatus assumes that the processing operation is performed by the CPU even when the processing operation of the CPU is actually completed and the storing operation of the disk is performed, the performance evaluating apparatus estimates the response time as too long.

Furthermore, as described above, parameters that affect the response time vary depending on idle time tidle and disk execution time tdisk (see FIG. 4 and FIG. 5). As a result, the performance evaluating apparatus is problematic in that it is unable to calculate a performance value with high accuracy.

SUMMARY OF THE INVENTION

It is an object of the present invention to provide a performance evaluating apparatus which is capable of calculating a performance value representing the performance of an information processing apparatus with high accuracy.

To achieve the above object, there is provided in accordance with the present invention a performance evaluating apparatus for calculating a performance value representing the performance of an information processing apparatus for performing a requested process, the information processing apparatus having a first processor for performing a first process and a second processor for performing a second process, and the information processing apparatus being arranged such that, for performing the requested process which includes a first partial process as the first process and a second partial process as the second process, the first processor performs the first process in a successive repetition of a first time in which the first processor performs the first partial process and a second time in which the first processor does not perform the first partial process, so that an executable time ratio represented by a value produced by dividing the first time by a value represented by the sum of the first time and the second time is equal to or smaller than a predetermined upper limit executable time ratio, the performance evaluating apparatus comprising first performance evaluating means for calculating a first performance value based on a first partial process execution time in which the first processor performs the first partial process and a second partial process execution time in which the second processor performs the second partial process, second performance evaluating means for calculating a second performance value based on the first partial process execution time and the upper limit executable time ratio, and selecting means for selecting either the first performance value or the second performance value as the performance value based on the upper limit executable time ratio, the first partial process execution time, and the second partial process execution time.

The performance evaluating apparatus selects, as the performance value, either the first performance value calculated based on the first partial process execution time and the second partial process execution time, or the second performance value calculated based on the upper limit executable time ratio and the first partial process execution time, depending on the upper limit executable time ratio, the first partial process execution time, and the second partial process execution time.

As a result, even if parameters which affect the performance value vary depending on the upper limit executable time ratio, the first partial process execution time, and the second partial process execution time, the performance evaluating apparatus can calculate a performance value with high accuracy.

The selecting means calculates a value as a waiting time by subtracting the first partial process execution time from a value produced by dividing the first partial process execution time by the upper limit executable time ratio, and selects the first performance value as the performance value if the waiting time is shorter than the second partial process execution time and selects the second performance value as the performance value if the waiting time is longer than the second partial process execution time.

According to the above arrangement, if the waiting time is shorter than the second partial process execution time, then the performance evaluating apparatus may calculate the sum of the first partial process execution time and the second partial process execution time as a response time. If the waiting time is longer than the second partial process execution time, then the performance evaluating apparatus may calculate the sum of the first partial process execution time and the waiting time as a response time. As a consequence, the performance evaluating apparatus can calculate a performance value with high accuracy.

The selecting means calculates a value as a first partial process execution time ratio by dividing the first partial process execution time by a value represented by the sum of the first partial process execution time and the second partial process execution time, and selects the first performance value as the performance value if the first partial process execution time ratio is smaller than the upper limit executable time ratio and selects the second performance value as the performance value if the first partial process execution time ratio is greater than the upper limit executable time ratio.

According to the above arrangement, if the first partial process execution time ratio is smaller than the upper limit executable time ratio, then the performance evaluating apparatus may calculate the sum of the first partial process execution time and the second partial process execution time as a response time. If the first partial process execution time ratio is greater than the upper limit executable time ratio, then the performance evaluating apparatus may calculate the sum of the first partial process execution time and the waiting time as a response time. As a consequence, the performance evaluating apparatus can calculate a performance value with high accuracy.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
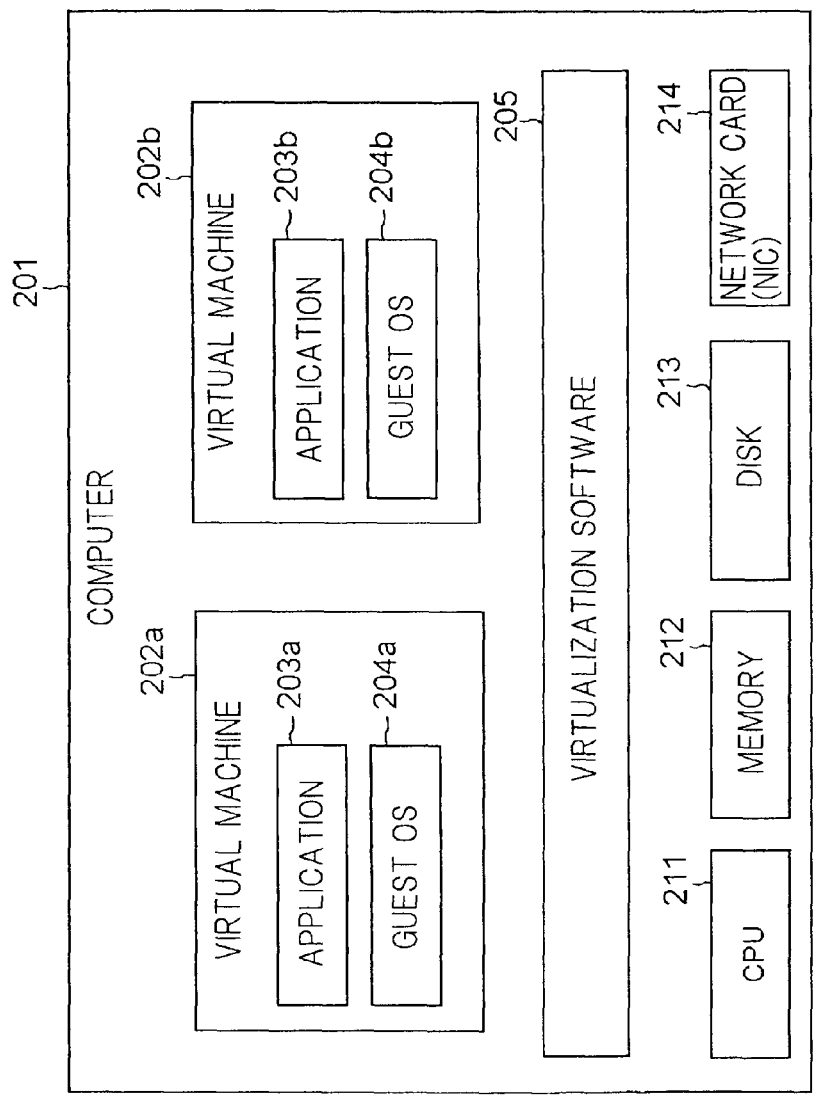
FIG. 1 is a block diagram of a computer system incorporating virtual machines.

Like or corresponding parts are denoted by like or corresponding reference characters throughout the views.

Performance evaluating apparatus, performance evaluating methods, and programs according to preferred exemplary embodiments will be described in detail below with reference to the drawings.

1st Exemplary Embodiment

A first exemplary embodiment of the present invention will be described in detail below with reference to the drawings.

Figure 7:
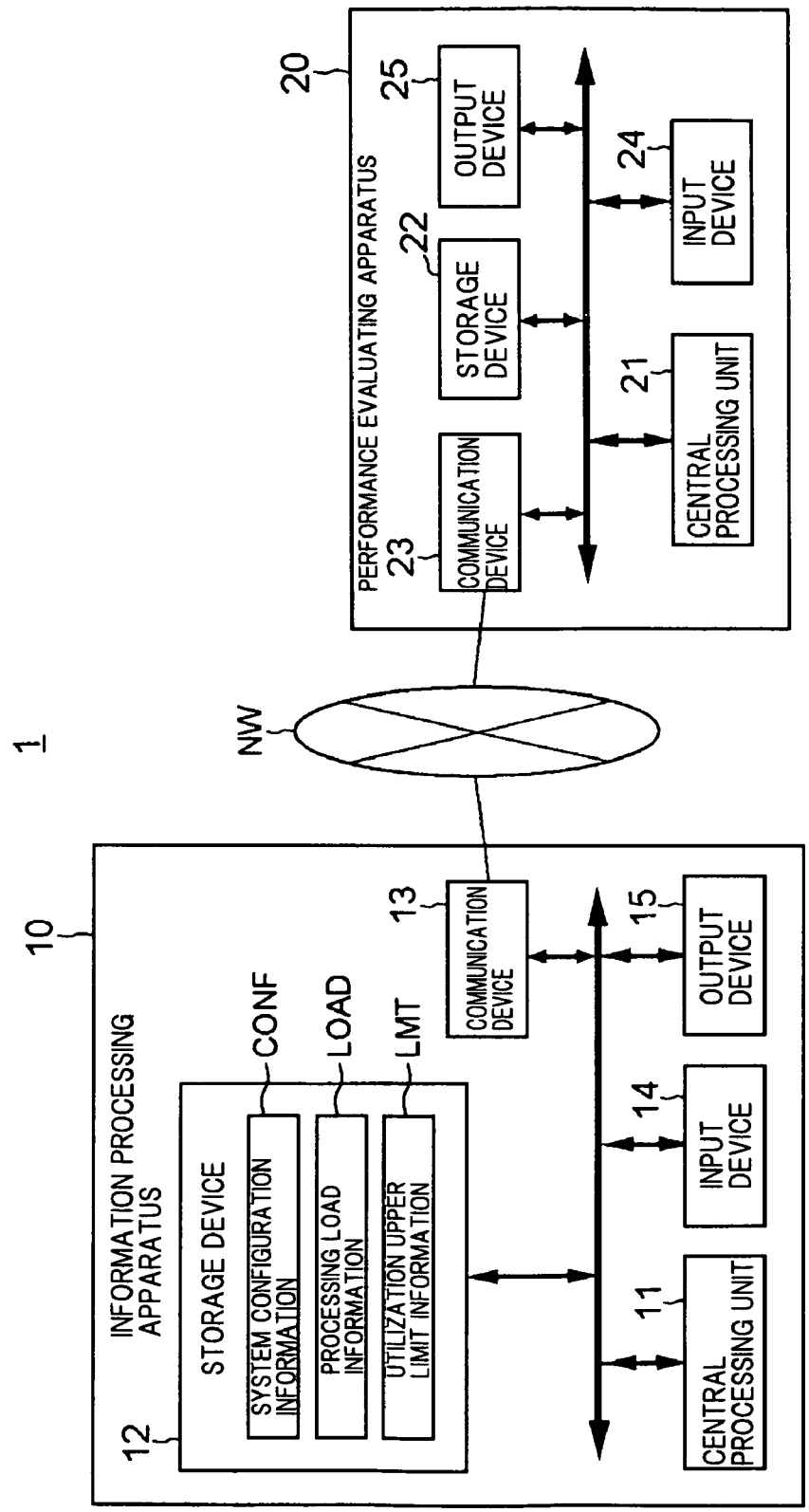
FIG. 7 is a block diagram of a performance evaluating system according to a first exemplary embodiment of the present invention.

FIG. 7 shows in block form performance evaluating system 1 according to the first exemplary embodiment of the present invention.

As shown in FIG. 7, performance evaluating system 1 comprises information processing apparatus 10 and performance evaluating apparatus 20.

Information processing apparatus 10 comprises central processing unit (CPU, also referred to as physical CPU) 11, storage device (a memory (RAM: Random Access Memory) and a hard disk drive (HDD), also referred to as disk drive or physical disk) 12, communication device (network interface) 13, input device (a mouse and a keyboard) 14, and output device (a display) 15.

Central processing unit 11, which serves as a first processor, is capable of performing a processing operation as a first process. Storage device 12, which serves as a second processor, is capable of performing a storing operation (writing operation and reading operation) as a second process.

Information processing apparatus 10 is arranged to perform functions, to be described later, when central processing unit 11 executes programs stored in storage device 12. Information processing apparatus 10 is connected to performance evaluating apparatus 20 by communication link NW for communications therewith. Information processing apparatus 10 communicates with performance evaluating apparatus 20 through communication device 13.

Information processing apparatus 10 provides a plurality of (two in the present exemplary embodiment) virtual machines VM1, VM2 when central processing unit 11 executes programs. Central processing unit 11 carries out processing operations based on applications executed by virtual machines VM1, VM2 on a time-sharing basis.

Specifically, central processing unit 11 carries out successive repetitions of processing operations the first time when central processing unit 11 carries out the processing operation of virtual machine VM1 and a second time in which central processing unit 11 does not carry out the processing operation of virtual machine VM1 (e.g., central processing unit 11 carries out the processing operation of virtual machine VM2). A value produced by dividing the first time by a value that represents the sum of the first time and the second time is referred to as a CPU utilization ratio (executable time ratio) of virtual machine VM1.

Storage device 12 stores system configuration information CONF, processing load information LOAD, and utilization upper limit information LMT.

System configuration information CONF refers to information representative of the configuration of the system. In the present exemplary embodiment, system configuration information CONF represents one physical CPU, one physical disk, and two virtual machines.

Processing load information LOAD refers to information representative of a time in which the processing apparatus (central processing unit 11 and storage device 12) indicated by system configuration information CONF performs a process when information processing apparatus 10 executes an application. In the present exemplary embodiment, processing load information LOAD includes CPU basic execution time tcpu and disk basic execution time tdisk0.

CPU basic execution time tcpu refers to the execution time of a processing operation performed by central processing unit 11 in cases where 100% of the processing capability of central processing unit 11 (physical CPU) is utilized, and does not include queuing times according to other processes. Disk basic execution time tdisk0 refers to the execution time of a processing operation (writing operation and/or reading operation) performed by storage device 12 in cases where 100% the processing capability of storage device 12 (physical disk) is utilized, and does not include queuing times according to other processes.

Information processing apparatus 10 measures each CPU basic execution time tcpu and each disk basic execution time tdisk0 when information processing apparatus 10 executes an application, and stores processing load information LOAD including CPU basic execution time tcpu and disk basic execution time tdisk0 which have been measured into storage device 12.

In the present exemplary embodiment, CPU basic execution time tcpu is 0.134 second and disk basic execution time tdisk0 is 0.939 second.

Utilization upper limit information LMT represents the upper limit (an upper limit value and an upper limit executable time ratio) for the CPU utilization ratio (executable time ratio) of each virtual machine. The CPU utilization ratio of a virtual machine refers to the ratio of "the time in which a processing operation performed by the virtual machine in a predetermined time is performed by central processing unit 11" to "the predetermined time".

For example, if the upper limit value $\alpha 1$ for CPU utilization established for virtual machine VM1 is 0.2 and the upper limit value $\alpha 2$ for CPU utilization established for virtual machine VM2 is 0.5, then virtual machine VM1 is permitted to use central processing unit 11 (physical CPU) for 20% of the time and virtual machine VM2 is permitted to use central processing unit 11 (physical CPU) for a 50% of the time.

Information processing apparatus 10 executes the processes of virtual machine VM1 and virtual machine VM2 such that the actual CPU utilization ratio of virtual machine VM1 is equal to or less than upper limit value $\alpha 1$ and the actual CPU utilization ratio of virtual machine VM2 is equal to or less than upper limit value $\alpha 2$.

Performance evaluating apparatus 20 is an apparatus for calculating a performance value which refers to a value representing the performance of information processing apparatus 10 for carrying out a process that is requested to be performed for virtual machine VM1 (requested process). The requested process is a process including the processing operation of central processing unit 11 which is referred to as a first partial process and the storing operation of storage device 12 which is referred to as a second partial process.

A general performance evaluating apparatus calculates a performance value on the assumption that a virtual CPU having a lower processing capability than a physical CPU performs a requested process at a CPU utilization ratio of 100%. However, performance evaluating apparatus 20 according to the present invention calculates a performance value on the assumption that a virtual CPU having the same processing capability as a physical CPU performs a requested process at a CPU utilization ratio that is lower than 100%, because it will calculate a performance value depending on the actual operation of the virtual machine when it carries out a process.

As with information processing apparatus 10, performance evaluating apparatus 20 comprises central processing unit 21, storage device 22, communication device 23, input device 24, and output device 25. Information processing apparatus 20 is also arranged to perform functions, to be described later, when central processing unit 21 executes programs stored in storage device 22.

Figure 8:
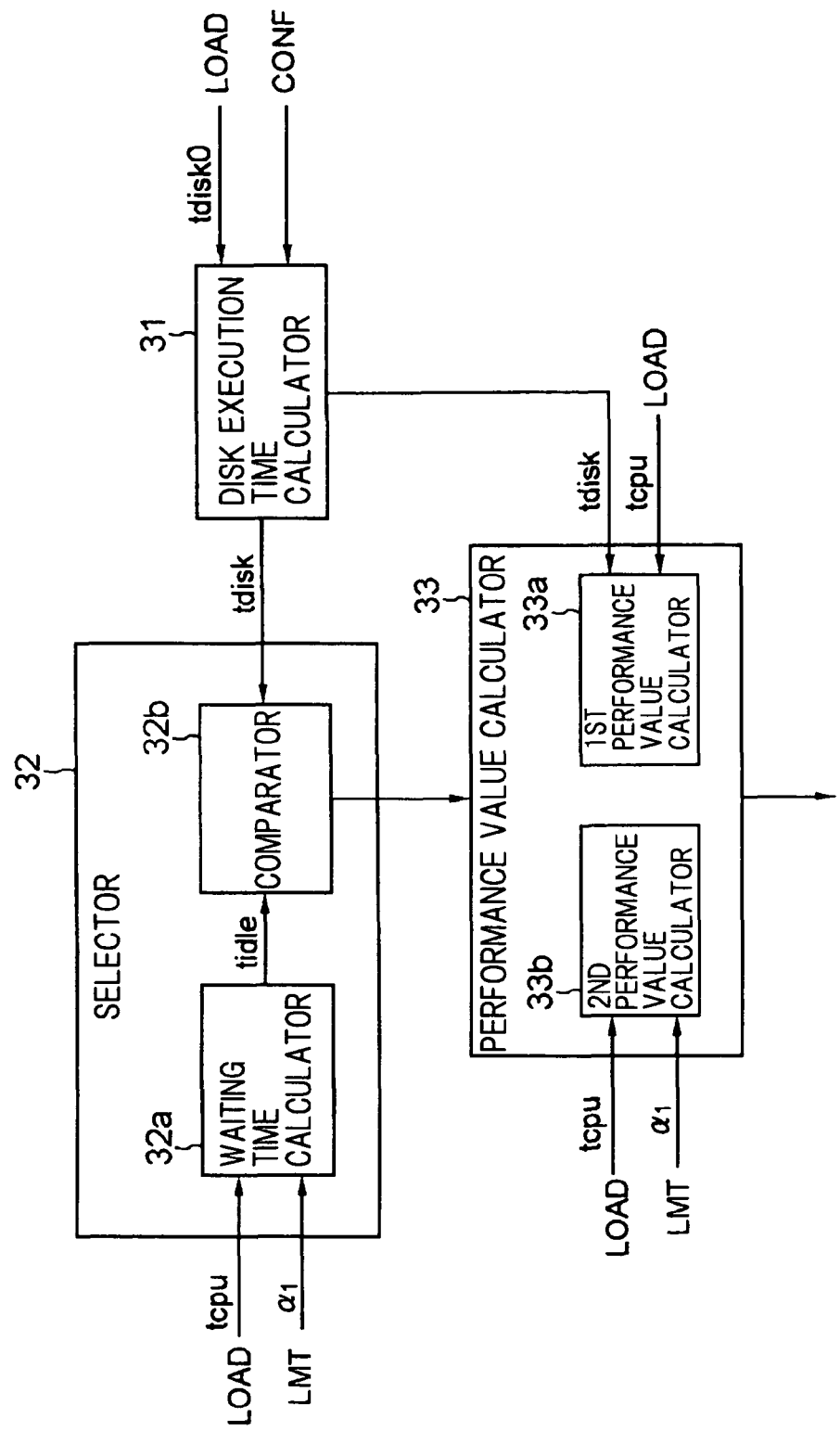
FIG. 8 is a block diagram showing functions of a performance evaluating apparatus shown in FIG. 7.

FIG. 8 shows in block form functions, which are relevant to the present invention, among the functions of performance evaluating apparatus 20 shown in FIG. 7.

The functions of performance evaluating apparatus 20 include disk execution time calculator 31, selector (selecting means) 32, and performance value calculator 33.

Disk execution time calculator 31 receives disk basic execution time tdisk0 included in processing load information LOAD stored in storage device 12 from information processing apparatus 10, and calculates disk execution time tdisk based on received disk basic execution time tdisk0. Disk execution time tdisk refers to a time in which storage device 12 carries out a storing operation as a second partial process that is included in the requested process for virtual machine VM1.

In the present exemplary embodiment, it is assumed that storage device 12 is not used by virtual machine VM2. Therefore, disk execution time calculator 31 calculates and outputs received disk basic execution time tdisk0 as disk execution time tdisk.

Figure 2:
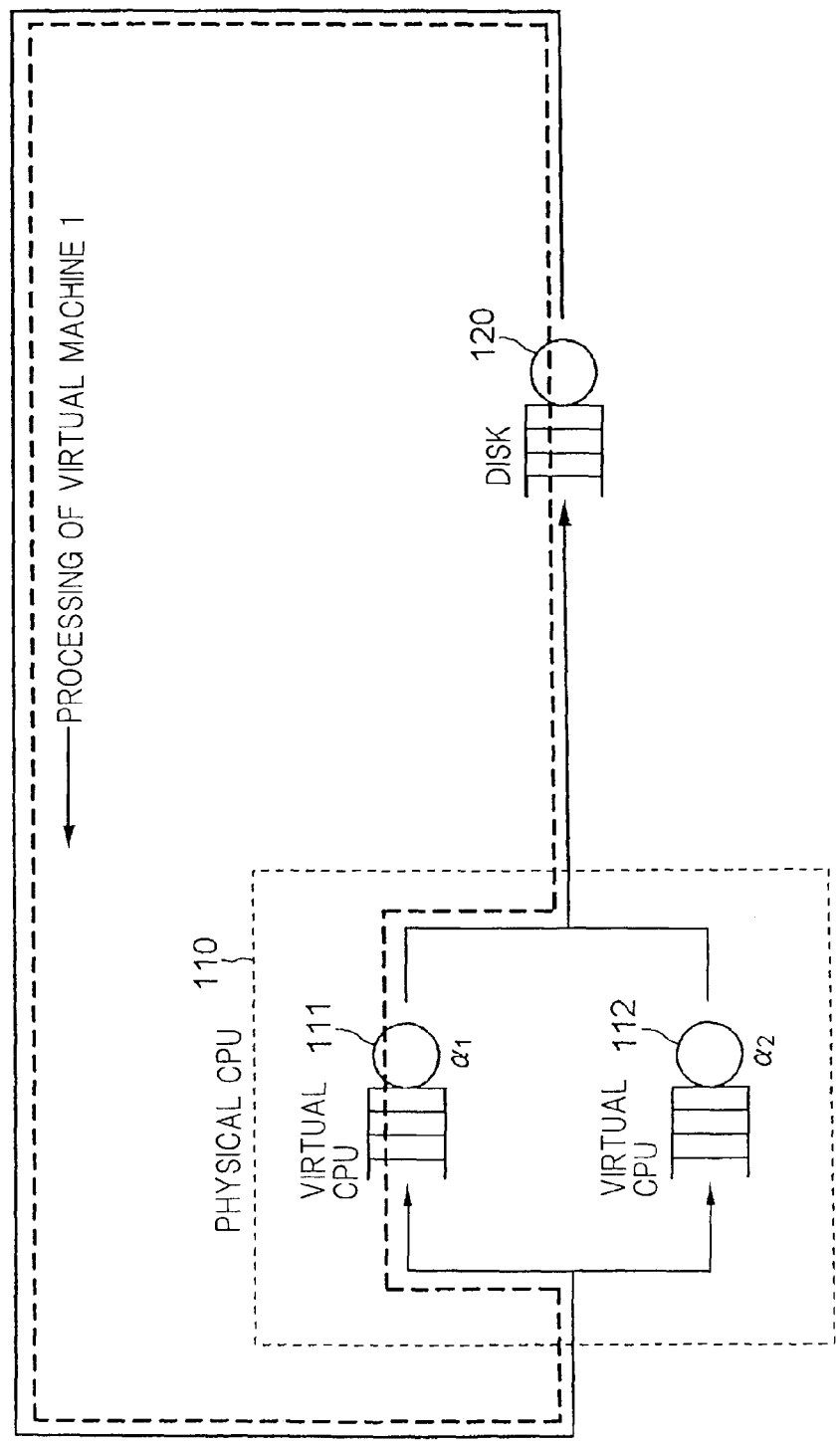
FIG. 2 is a diagram showing a queuing model for calculating a disk execution time.
Figure 3:
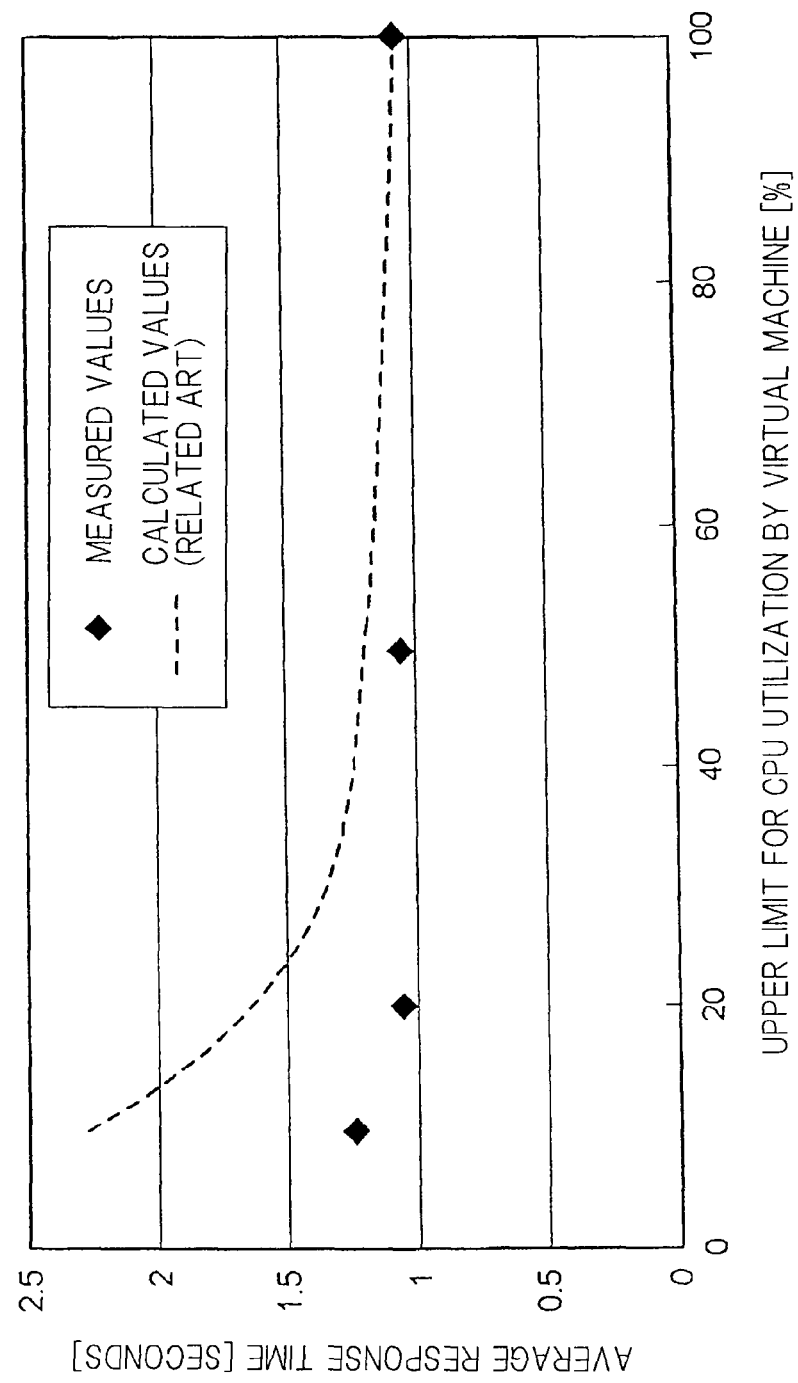
FIG. 3 is a graph showing, for comparison, performance values calculated by a general performance evaluating apparatus and measured performance values.
Figure 4:
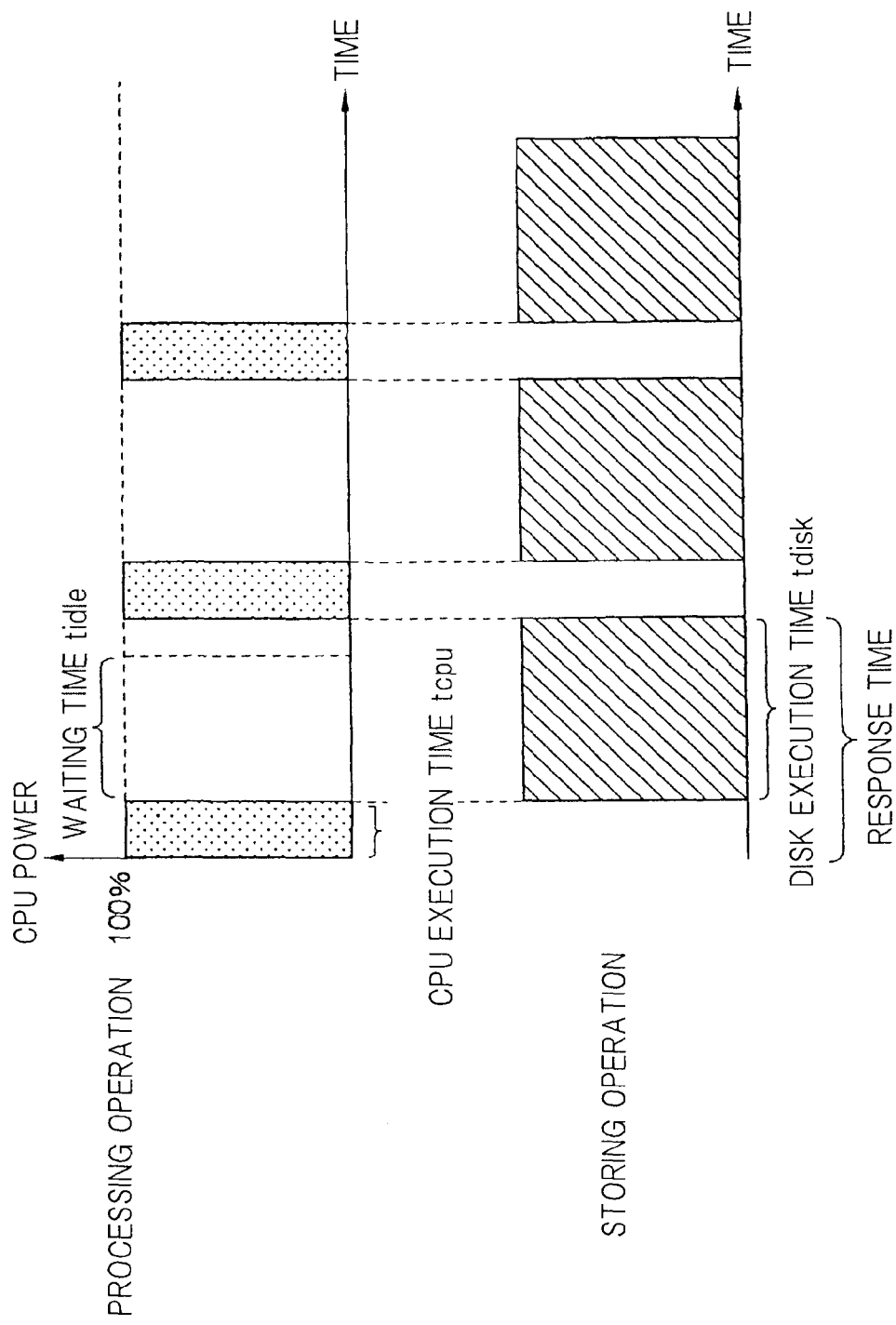
FIG. 4 is a diagram illustrative of the operation of an actual virtual machine when the waiting time is shorter than the disk execution time.
Figure 5:
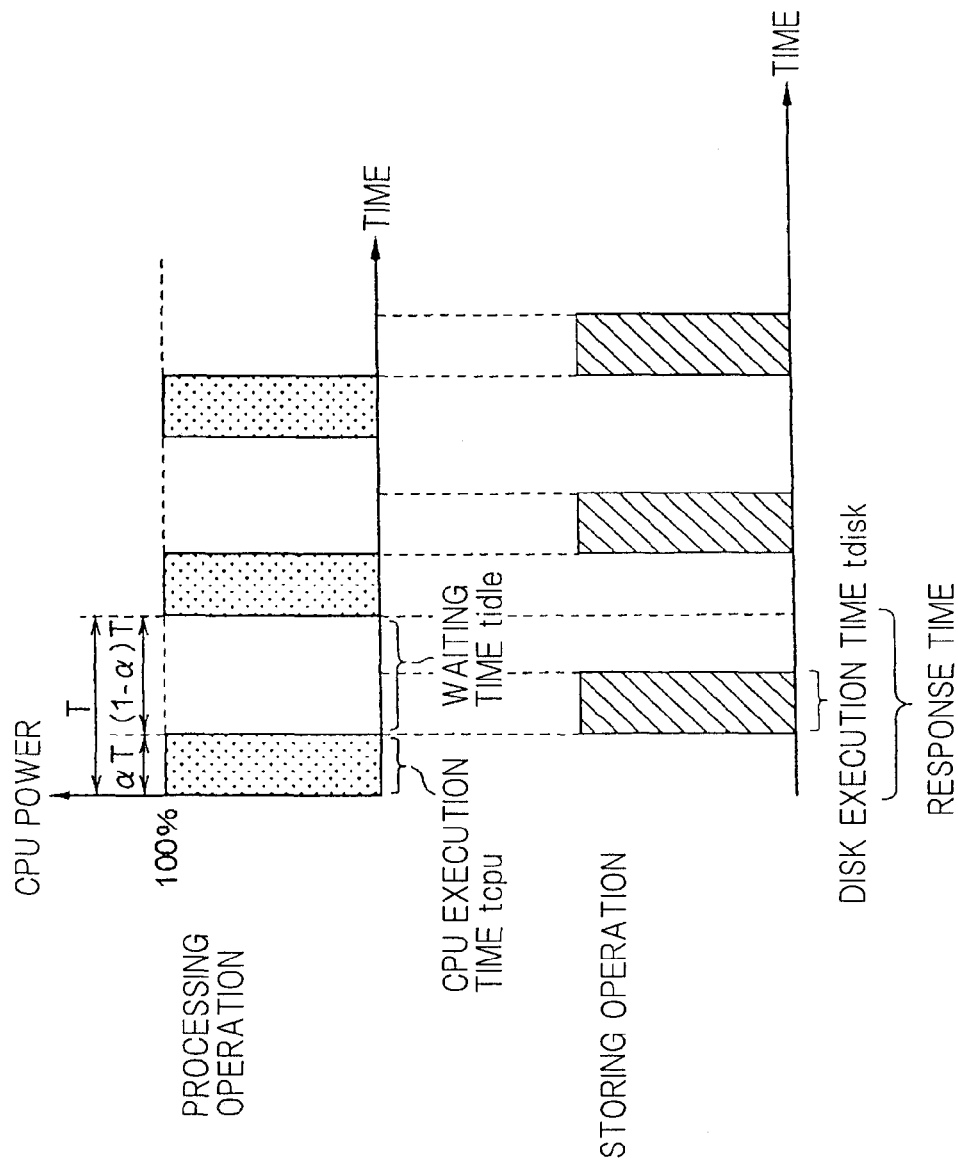
FIG. 5 is a diagram illustrative of the operation of an actual virtual machine when the waiting time is longer than the disk execution time.
Figure 6:
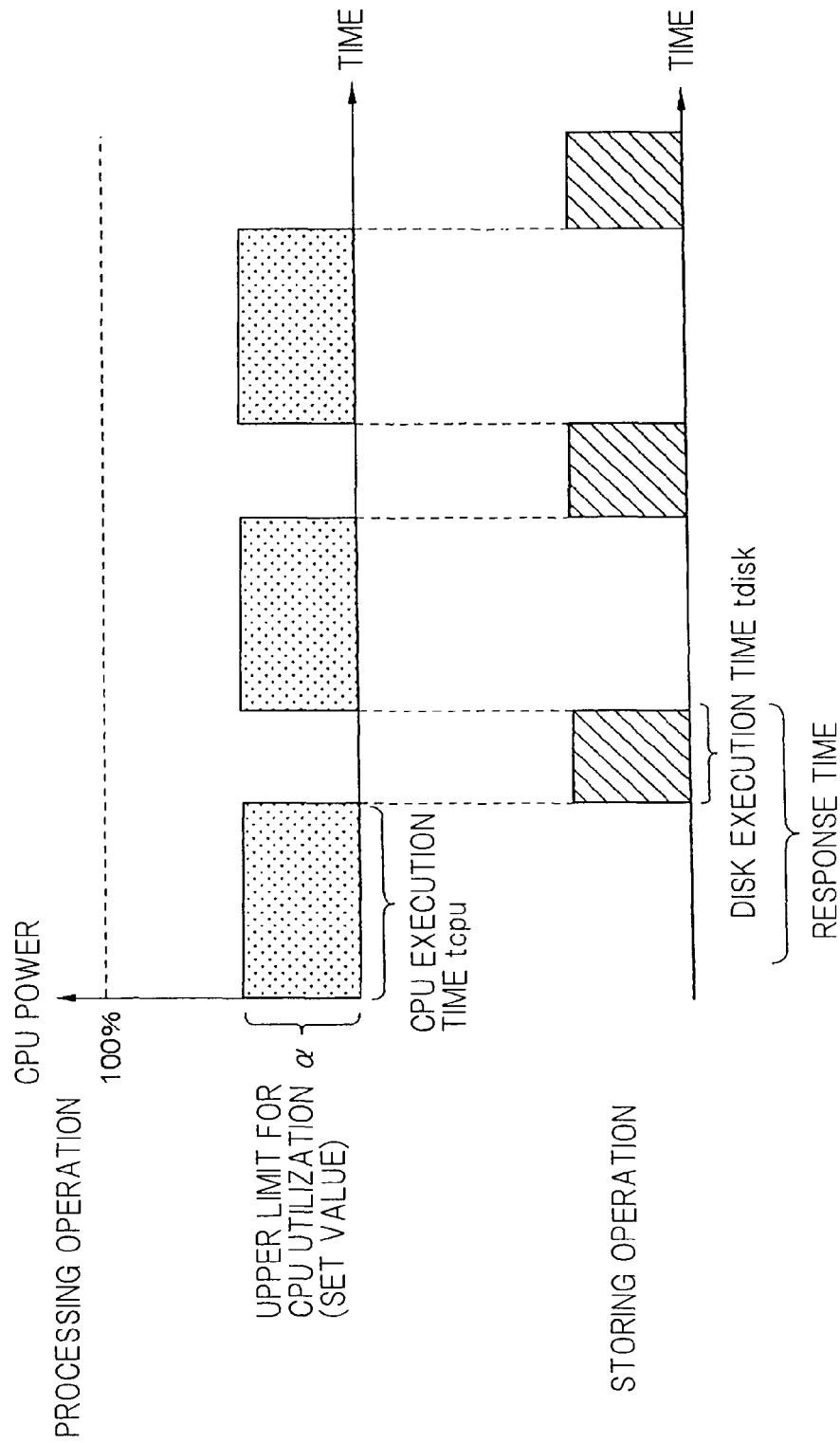
FIG. 6 is a diagram illustrative of the operation of an actual virtual machine that is assumed by a general performance evaluating apparatus according to the related art.

If storage device 12 is used by virtual machine VM2, then disk execution time calculator 31 calculates disk execution time tdisk using the queuing model shown in FIG. 2. The queuing model shown in FIG. 2 is a model in which physical CPU 110 is shared by the virtual machines that have respective virtual CPUs 111, 112. The queuing model is also a model in which physical disk 120 is shared by the two virtual machines.

If storage device 12 is a RAID (Redundant Arrays of Inexpensive Disks) comprising N disk drives, then it is preferable to perform queuing calculations such that the processing time per job of each disk drive is 1/N times disk basic execution time tdisk0.

Selector 32 includes waiting time calculator 32a and comparator 32b.

Waiting time calculator 32a receives CPU basic execution time tcpu included in processing load information LOAD stored in storage device 12 as CPU execution time tcpu from information processing apparatus 10. CPU execution time tcpu refers to a time in which central processing unit 11 carries out a processing operation as a first partial process that is included in the requested process for virtual machine VM1.

Waiting time calculator 32a also receives utilization upper limit information LMT stored in storage device 12 from information processing apparatus 10.

Waiting time calculator 32a calculates value tcpu/α1−tcpu as waiting time tidle by dividing received CPU execution time tcpu by upper limit value α1 for CPU utilization indicated for virtual machine VM1 by received utilization upper limit information LMT and subtracting CPU execution time tcpu from quotient tcpu/α1.

If CPU execution time tcpu is of 100 milliseconds and upper limit value α1 for CPU utilization is 0.25, then waiting time calculator 32a calculates 300 milliseconds as waiting time tidle that is required for controlling the CPU utilization ratio to be equal to or smaller than upper limit value α1.

Comparator 32b compares waiting time tidle calculated by waiting time calculator 32a and disk execution time tdisk calculated by disk execution time calculator 31 with each other, and outputs the result of the comparison.

Therefore, it can be said that selector 32 selects either a first performance value or a second performance value as a performance base, as described later, based on upper limit value α1 for CPU utilization, CPU execution time tcpu, and disk execution time tdisk.

Performance value calculator 33 calculates a response time (in the present exemplary embodiment, an average response time representing an average value of response times), a throughput, and a CPU utilization ratio of virtual machine VM1, as performance values. The response time represents a time after virtual machine VM1 of information processing apparatus 10 has started to perform one requested process until it starts to perform another requested process. The throughput represents the number of requested processes which can be performed per unit time by virtual machine VM1 of information processing apparatus 10. The CPU utilization ratio (utilization ratio) of virtual machine VM1 represents the ratio of "the time in which a processing operation included in the one requested process is performed by central processing unit 11" to "the time after virtual machine VM1 has started to perform the one requested process until it starts to perform the other requested process".

Performance value calculator 33 comprises first performance value calculator 33a and second performance value calculator 33b.

First performance value calculator 33a receives CPU basic execution time tcpu included in processing load information LOAD stored in storage device 12 as CPU execution time tcpu from information processing apparatus 10.

First performance value calculator 33a calculates the sum of received CPU execution time tcpu and disk execution time tdisk calculated by disk execution time calculator 31 as a response time. Furthermore, first performance value calculator 33a calculates the reciprocal of the sum of received CPU execution time tcpu and disk execution time tdisk calculated by disk execution time calculator 31 as a throughput. In addition, first performance value calculator 33a calculates a value as the CPU utilization ratio (utilization ratio) of virtual machine VM1 by dividing received CPU execution time tcpu by the sum of received CPU execution time tcpu and disk execution time tdisk calculated by disk execution time calculator 31.

Therefore, it can be said that first performance value calculator 33a calculates a first performance value based on CPU execution time tcpu and disk execution time tdisk.

Second performance value calculator 33b receives CPU basic execution time tcpu included in processing load information LOAD stored in storage device 12 as CPU execution time tcpu from information processing apparatus 10. Second performance value calculator 33b also receives utilization upper limit information LMT stored in storage device 12 from information processing apparatus 10.

Second performance value calculator 33b calculates a value as a response time by dividing received CPU execution time tcpu by upper limit value α1 for CPU utilization indicated for virtual machine VM1 by received utilization upper limit information LMT. Furthermore, second performance value calculator 33b calculates a value as a throughput by dividing upper limit value α1 for CPU utilization indicated for virtual machine VM1 by received utilization upper limit information LMT by received CPU execution time tcpu. In addition, second performance value calculator 33b calculates and outputs upper limit value α1 for CPU utilization indicated for virtual machine VM1 by received utilization upper limit information LMT as a CPU utilization ratio of virtual machine VM1.

Therefore, it can be said that second performance value calculator 33b calculates a second performance value based on CPU execution time tcpu and upper limit value α1 for CPU utilization.

If the result of the comparison output from comparator 32b indicates that waiting time tidle is shorter than disk execution time tdisk, then performance value calculator 33 outputs a performance value calculated by first performance value calculator 33a. If the result of the comparison output from comparator 32b indicates that waiting time tidle is longer than disk execution time tdisk, then performance value calculator 33 outputs a performance value calculated by second performance value calculator 33b.

An operation sequence of the performance evaluating apparatus according to the first exemplary embodiment of the present invention will be described below with reference to FIG. 9.

Figure 9:
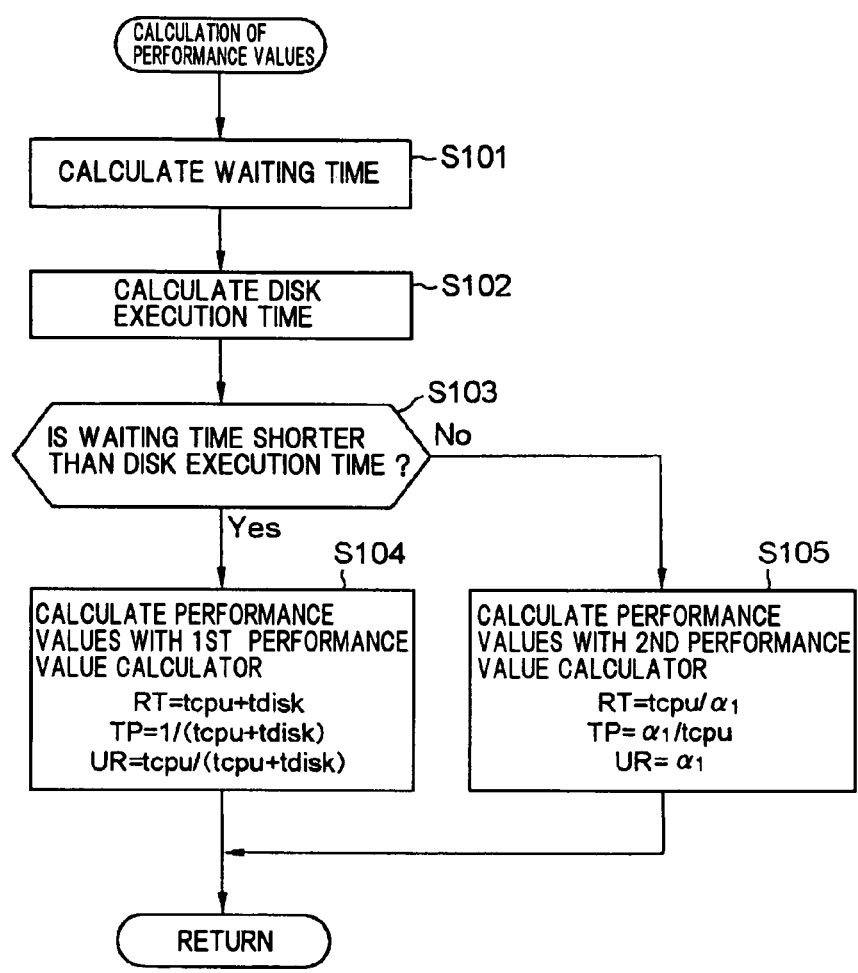
FIG. 9 is a flowchart of an operation sequence of the performance evaluating apparatus shown in FIG. 7.

FIG. 9 is a flowchart of an operation sequence of performance evaluating apparatus 20 shown in FIG. 7.

In step S101 shown in FIG. 9, central processing unit 21 of performance evaluating apparatus 20 calculates waiting time tidle based on CPU execution time tcpu included in processing load information LOAD stored in storage device 12 of information processing apparatus 10 and upper limit value $\alpha 1$ for CPU utilization indicated for virtual machine VM1 by utilization upper limit information LMT stored in storage device 12.

Specifically, central processing unit 21 calculates waiting time tidle according to the equation: tidle=(tcpu/$\alpha 1$)−tcpu. For example, if CPU execution time tcpu is 0.134 second and upper limit value $\alpha 1$ for CPU utilization by virtual machine VM1 is 0.1, then central processing unit 21 calculates 1.206 seconds as waiting time tidle. If upper limit value $\alpha 1$ for CPU utilization by virtual machine VM1 is 0.5, then central processing unit 21 calculates 0.134 seconds as waiting time tidle.

Then, in step S102, central processing unit 21 calculates disk execution time tdisk based on disk basic execution time tdisk0 included in processing load information LOAD stored in storage device 12. In the present exemplary embodiment, it is assumed that central processing unit 21 calculates 0.939 second as disk execution time tdisk.

Either step S101 or step S102 may be executed first.

In step S103, central processing unit 21 determines whether calculated waiting time tidle is shorter than calculated disk execution time tdisk or not (selecting step).

It is assumed here that upper limit value $\alpha 1$ is 0.5 as described above. In this case, waiting time tidle is 0.134 second. Therefore, waiting time tidle is shorter than disk execution time tdisk.

Central processing unit 21 judges "Yes" in step S103, and calculates response time RT, throughput TP, and CPT utilization ratio UR as performance values in step S104 (first performance evaluating step). Specifically, central processing unit 21 calculates response time RT according to the equation: RT=tcpu+tdisk. Central processing unit 21 also calculates throughput TP according to the equation: TP=1/(tcpu+tdisk). In addition, central processing unit 21 calculates CPT utilization ratio UR according to the equation: UR=tcpu/(tcpu+tdisk).

According to the above assumption, since tcpu=0.134 second and tdisk=0.939 second, central processing unit 21 calculates response time RT=1.073 seconds, throughput TP=0.932 (number of requested processes/second), and CPU utilization ratio UR=0.125.

It is now assumed that upper limit value $\alpha 1$ is 0.1. In this case, waiting time tidle is 1.206 seconds. Therefore, waiting time tidle is longer than disk execution time tdisk.

Central processing unit 21 judges "No" in step S103, and calculates response time RT, throughput TP, and CPT utilization ratio UR as performance values in step S105 (second performance evaluating step). Specifically, central processing unit 21 calculates response time RT according to the equation: RT=tcpu/$\alpha 1$. Central processing unit 21 also calculates throughput TP according to the equation: TP=$\alpha 1$/tcpu. In addition, central processing unit 21 calculates CPT utilization ratio UR according to the equation: UR=$\alpha 1$.

According to the above assumption, since tcpu=0.134 second and $\alpha 1$=0.1, central processing unit 21 calculates response time RT=1.34 seconds, throughput TP=0.746 (number of requested processes/second), and CPU utilization ratio UR=0.1.

Figure 10:
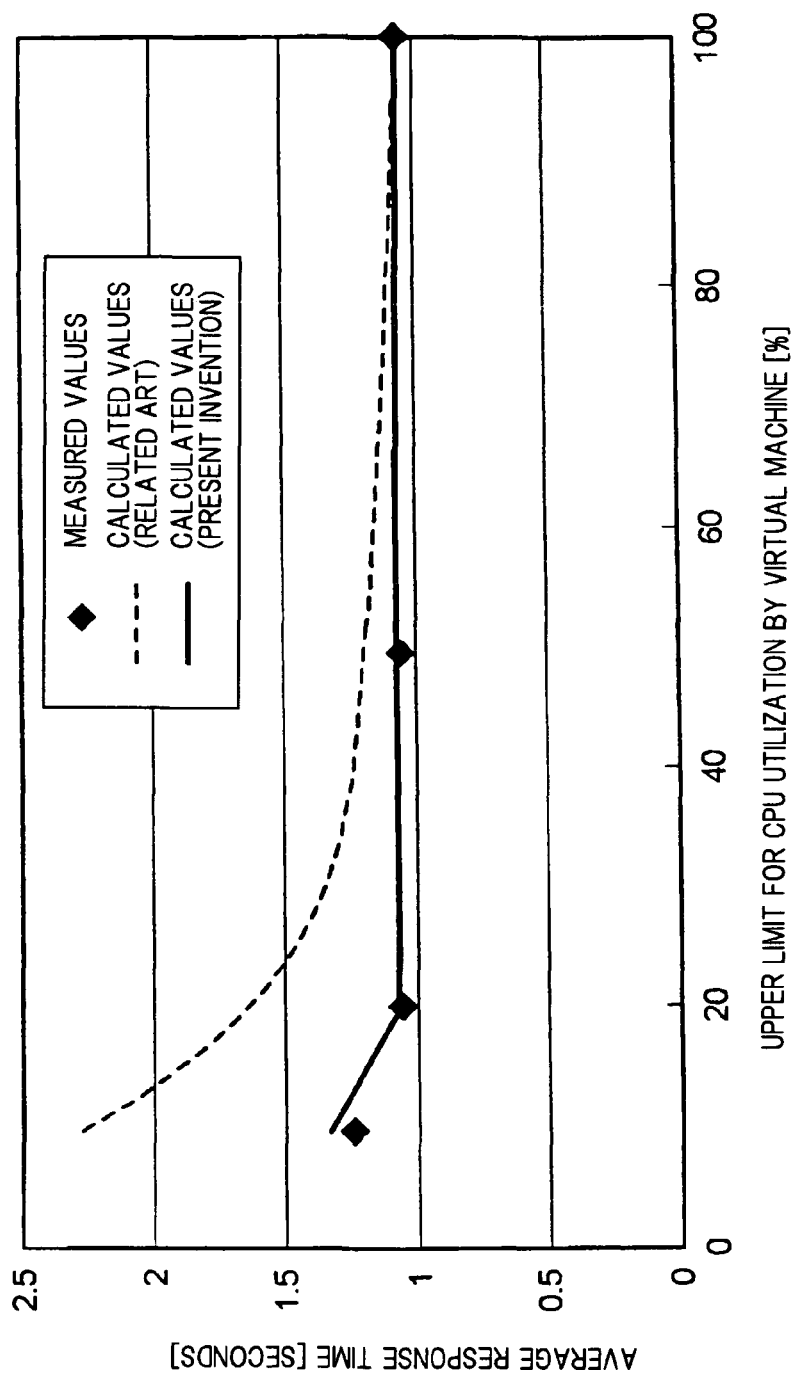
FIG. 10 is a graph showing, for comparison, performance values calculated by the performance evaluating apparatus according to the first exemplary embodiment and measured performance values, the graph being illustrative of how a response time varies as the upper limit for CPU utilization by a virtual machine is changed.
Figure 11:
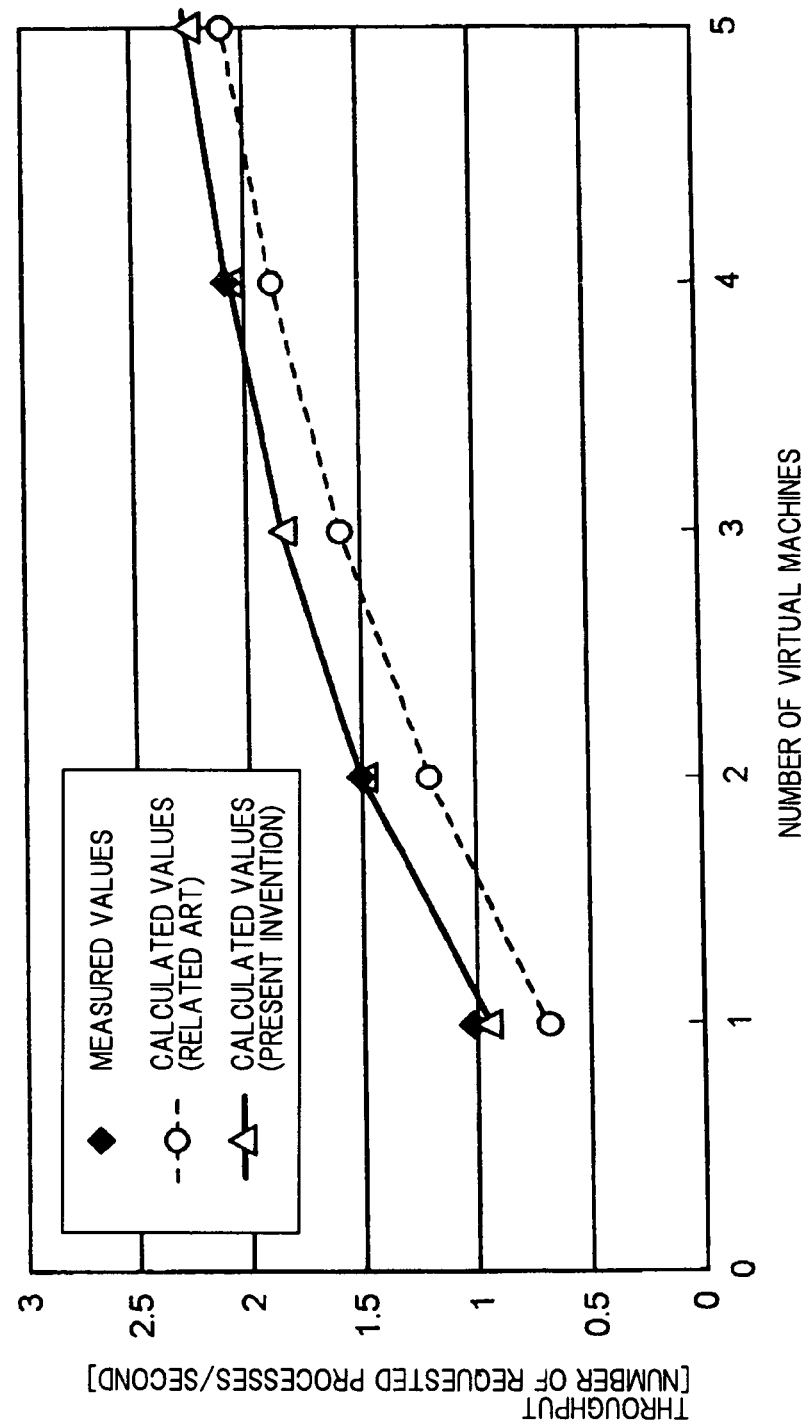
FIG. 11 is a graph showing, for comparison, performance values calculated by the performance evaluating apparatus according to the first exemplary embodiment and measured performance values, the graph being illustrative of how a throughput varies as the number of virtual machines is changed.

FIGS. 10 and 11 are graphs showing how performance values calculated by performance evaluating apparatus 20 and measured actual performance values vary when utilization upper limit information LMT is stored in storage device 12, i.e., the upper limit value for CPU utilization, and the number of virtual machines of information processing apparatus 10 are changed.

FIG. 10 shows how an average response time varies as the upper limit for CPU utilization assigned to a virtual machine is changed. Jobs (requested processes) executed on the virtual machine are sequentially processed. The average value of CPU execution time tcpu is 0.134 second and the average value of disc execution time tdisk is 0.939 second. They are performance values under the same conditions as the conditions described with respect to the problems of the general apparatus. The performance values calculated by performance evaluating apparatus 20 according to the present invention are closer to the measured values than the performance values calculated by the general apparatus. In other words, performance evaluating apparatus 20 can calculate performance values with higher accuracy.

FIG. 11 shows how the sum of the throughputs of all virtual machines varies as the number of virtual machines is changed. The upper limit for CPU utilization by each virtual machine is set to 0.25. Jobs executed on all the virtual machine are sequentially processed. The average value of CPU execution time tcpu is 0.134 second and the average value of disc execution time tdisk is 0.939 second. It can thus be understood from FIG. 11 that performance evaluating apparatus 20 can calculate performance values with higher accuracy even if the number of virtual machines is changed.

According to the first exemplary embodiment, as described above, performance evaluating apparatus 20 selects either the first performance value calculated based on CPU execution time tcpu and disk execution time tdisk or the second performance value calculated based on upper limit value $\alpha 1$ for CPU utilization and CPU execution time tcpu, depending on upper limit value $\alpha 1$ for CPU utilization which serves as an upper limit executable time ratio, CPU execution time tcpu which serves as a first partial process execution time, and disk execution time tdisk which serves as a second partial process execution time.

Consequently, even if parameters which affect performance values vary depending on upper limit value $\alpha 1$ for CPU utilization, CPU execution time tcpu, and disk execution time tdisk, performance evaluating apparatus 20 can calculate performance values with high accuracy.

According to the first exemplary embodiment, furthermore, if waiting time tidle is shorter than disk execution time tdisk, then performance evaluating apparatus 20 calculates the sum of CPU execution time tcpu and disk execution time tdisk as a response time, and if waiting time tidle is longer than disk execution time tdisk, then performance evaluating apparatus 20 calculates the sum of CPU execution time tcpu and waiting time tidle as a response time. As a result, performance evaluating apparatus 20 can calculate performance values with high accuracy.

2nd Exemplary Embodiment

A second exemplary embodiment of the present invention will be described in detail below with reference to the drawings.

Performance evaluating apparatus 20 according to the first exemplary embodiment is arranged to select either the first performance value or the second performance value based on the result of the comparison between waiting time tidle and disk execution time tdisk, i.e., based on the relationship between their magnitudes.

Performance evaluating apparatus 20 according to the second exemplary embodiment is arranged to select either the first performance value or the second performance value based on the result of the comparison between processing operation execution time ratio ρ and upper limit value α1 for CPU utilization, i.e., based on the relationship between their magnitudes. Processing operation execution time ratio ρ refers to the ratio of CPU execution time tcpu to a time in which an entire requested process is executed.

Performance evaluating apparatus 20 according to the second exemplary embodiment, mainly the differences between itself and performance evaluating apparatus 20 according to the first exemplary embodiment, will be described below.

Figure 12:
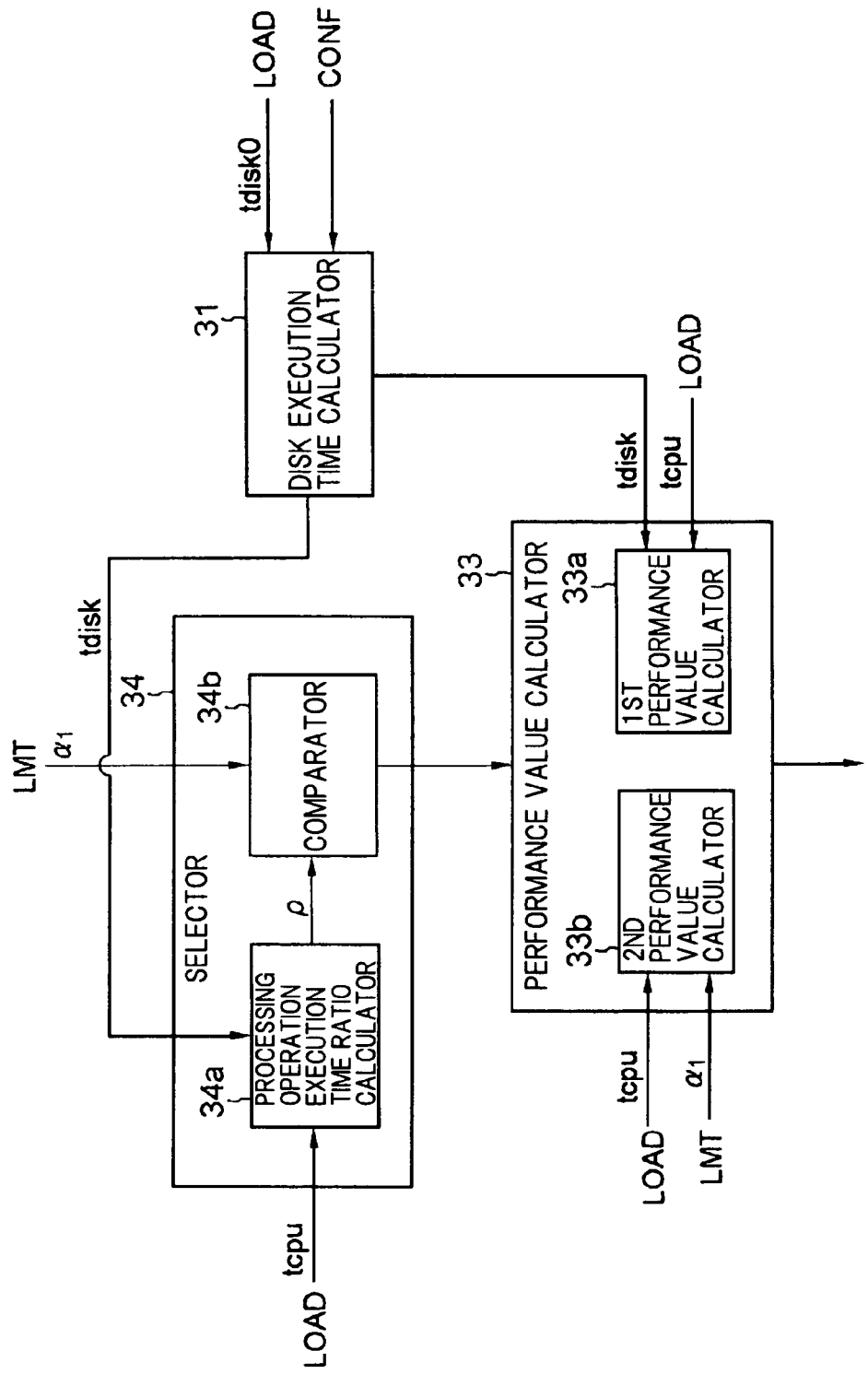
FIG. 12 is a block diagram showing functions of a performance evaluating apparatus according to a second exemplary embodiment of the present invention.

The functions of performance evaluating apparatus 20 according to the second exemplary embodiment include selector 34 shown in FIG. 12, in place of selector 32 shown in FIG. 8.

Selector 34 comprises processing operation execution time ratio calculator 34a and comparator 34b.

Processing operation execution time ratio calculator 34a receives CPU basic execution time tcpu included in processing load information LOAD stored in storage device 12 as CPU execution time tcpu from information processing apparatus 10.

Processing operation execution time ratio calculator 34a calculates processing operation execution time ratio ρ which serves as a first partial process execution time ratio based on received CPU execution time tcpu and disk execution time tdisk calculated by disk execution time calculator 31.

As described above, processing operation execution time ratio ρ refers to the ratio of CPU execution time tcpu to a time in which an entire requested process is executed. If most of the execution time of the requested process is taken up by the execution times of the processing operations of central processing unit 11 and storage device 12, then processing operation execution time ratio ρ is almost equal to a value that is produced by dividing CPU execution time tcpu by the sum of CPU execution time tcpu and disk execution time tdisk.

Therefore, processing operation execution time ratio calculator 34a calculates processing operation execution time ratio ρ according to the equation: ρ=tcpu/(tcpu+tdisk).

Comparator 34b receives utilization upper limit information LMT stored in storage device 12 from information processing apparatus 10. Comparator 34b compares processing operation execution time ratio ρ calculated by processing operation execution time ratio calculator 34a and upper limit value ρ 1 for CPU utilization indicated for virtual machine VM1 by received utilization upper limit information LMT, with each other, and outputs the result of the comparison.

If the result of the comparison output from comparator 34b indicates that processing operation execution time ratio ρ is smaller than upper limit value α1 for CPU utilization, then performance value calculator 33 outputs the performance value calculated by first performance value calculator 33a. If the result of the comparison output from comparator 34b indicates that processing operation execution time ratio ρ is greater than upper limit value α1 for CPU utilization, then performance value calculator 33 outputs the performance value calculated by second performance value calculator 33b.

Figure 13:
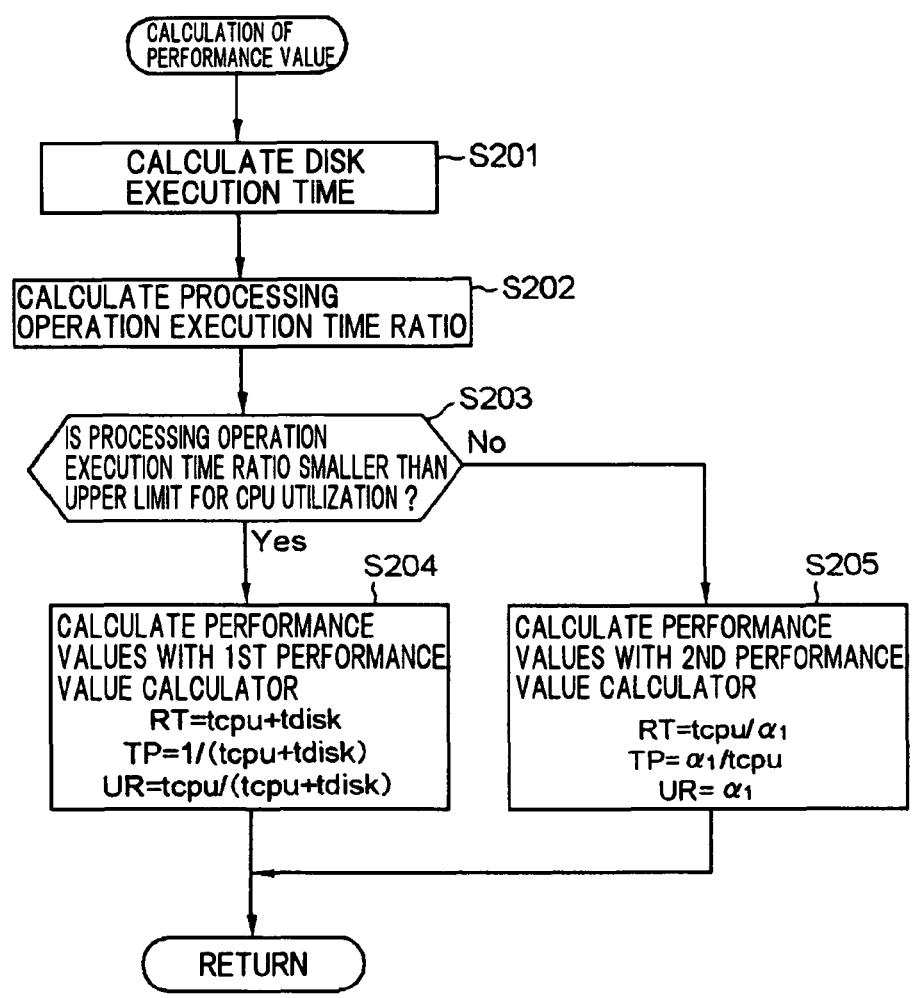
FIG. 13 is a flowchart of an operation sequence of the performance evaluating apparatus according to the second exemplary embodiment of the present invention.

An operation sequence of performance evaluating apparatus 20 according to the second exemplary embodiment of the present invention will be described below with reference to a flowchart shown in FIG. 13.

In step S201, central processing unit 21 of performance evaluating apparatus 20 calculates disk execution time tdisk based on disk basic execution time tdisk0 included in processing load information LOAD stored in storage device 12 of information processing apparatus 10. In the present exemplary embodiment, it is assumed that central processing unit 21 calculates 0.939 second as disk execution time tdisk.

Then, in step S202, central processing unit 21 calculates processing operation execution time ratio ρ based on CPU execution time tcpu, included in processing load information LOAD stored in storage device 12, and on calculated disk execution time tdisk.

Specifically, central processing unit 21 calculates processing operation execution time ratio ρ according to the equation: ρ=tcpu/(tcpu+tdisk). For example, if CPU execution time tcpu is of 0.134 second and disk execution time tdisk is of 0.939 second, then central processing unit 21 calculates 0.125 as processing operation execution time ratio ρ.

In step S203, central processing unit 21 determines whether calculated processing operation execution time ratio ρ is smaller than upper limit value α1 for CPU utilization indicated for virtual machine VM1 by received utilization upper limit information LMT stored in storage device 12 or not (selecting step).

It is assumed here that upper limit value α1 is of 0.5. In this case, calculated processing operation execution time ratio ρ is smaller than upper limit value α1.

Central processing unit 21 judges "Yes" in step S203, and calculates response time RT, throughput TP, and CPT utilization ratio UR as performance values in step S204 (first performance evaluating step). Specifically, central processing unit 21 calculates response time RT according to the equation: RT=tcpu+tdisk. Central processing unit 21 also calculates throughput TP according to the equation: TP=1/(tcpu+tdisk). In addition, central processing unit 21 calculates CPT utilization ratio UR according to the equation: UR=tcpu/(tcpu+tdisk).

According to the above assumption, since tcpu=0.134 second and tdisk=0.939 second, central processing unit 21 calculates response time RT=1.073 seconds, throughput TP=0.932 (number of requested processes/second), and CPU utilization ratio UR=0.125.

It is now assumed that upper limit value α1 is 0.1. In this case, calculated processing operation execution time ratio ρ is greater than upper limit value α1.

Central processing unit 21 judges "No" in step S203, and calculates response time RT, throughput TP, and CPT utilization ratio UR as performance values in step S205 (second performance evaluating step). Specifically, central processing unit 21 calculates response time RT according to the equation: RT=tcpu/α1. Central processing unit 21 also calculates throughput TP according to the equation: TP=α1/tcpu. In addition, central processing unit 21 calculates CPT utilization ratio UR according to the equation: UR=α1.

According to the above assumption, since tcpu=0.134 second and α1=0.1, central processing unit 21 calculates response time RT=1.34 seconds, throughput TP=0.746 (number of requested processes/second), and CPU utilization ratio UR=0.1.

According to the second exemplary embodiment, performance evaluating apparatus 20 can calculate performance values in the same manner as performance evaluating apparatus 20 according to the first exemplary embodiment. Consequently, performance evaluating apparatus 20 according to the second exemplary embodiment operates in the same manner as and offers the same advantages as performance evaluating apparatus 20 according to the first exemplary embodiment.

The present invention is not limited to the above exemplary embodiments, but various modifications may be made within the scope of the invention. For example, in each of the above exemplary embodiments, storage device 12 comprises a single disk drive. However, it may comprise a plurality of disk drives, and such a plurality of disk drives may make up a RAID system.

In each of the above exemplary embodiments, the central processing unit is used as the first processor, and the storage device is used as the second processor. However, other processors such as a printer for printing information may be used. While a requested process includes a processing operation and a storing operation in each of the above exemplary embodiments, it may include other processes such as a printing process in addition to a processing operation and a storing operation.

In each of the above exemplary embodiments, information processing apparatus 10 and performance evaluating apparatus 20 are two independent apparatuses. However, one apparatus may have both the function of information processing apparatus 10 and the function of performance evaluating apparatus 20.

The present invention is applicable to a performance evaluating system for calculating performance values of an information processing apparatus based on the virtual machine technology.

According to the present invention, the processing sequence of performance evaluating apparatus 20 may be implemented by the dedicated hardware described above, and may also be implemented by recording programs for realizing the functions performance evaluating apparatus 20 in a recording medium which can be read by performance evaluating apparatus 20, reading the programs recorded in the recording medium into performance evaluating apparatus 20, and executing the read programs. The recording medium which can be read by performance evaluating apparatus 20 may refer to an IC card, a memory card, a removable recording medium such as a floppy disk, a magnetooptical disk, a DVD, a CD, or the like, or an HDD or the like incorporated in performance evaluating apparatus 20. The programs recorded in the recording medium are read by a control block, for example, and the control block performs a control sequence to carry out the same processes as described above.

While a preferred embodiment of the present invention has been described using specific terms, such description is for illustrative purposed only, and it is to be understood that changes and variations may be made without departing from the sprit or scope of the following claims.

What is claimed is:

1. A performance evaluating apparatus for calculating a performance value representing the performance of an information processing apparatus for performing a requested process, the information processing apparatus having a first processor for performing a first process and a second processor for performing a second process, and the information processing apparatus being arranged such that for performing the requested process which includes a first partial process as said first process and a second partial process as said second process, said first processor performs said first process in a successive repetition of a first partial process execution time in which said first processor performs said first partial process and a second time in which said first processor does not perform said first partial process, so that an executable time ratio represented by a value produced by dividing said first partial process execution time by a value represented by the sum of said first partial process execution time and said second time is equal to or smaller than a predetermined upper limit executable time ratio, said performance evaluating apparatus comprising:
a first performance value calculator configured to calculate a first performance value based on said first partial process execution time in which said first processor performs said first partial process and a second partial process execution time in which said second processor performs said second partial process;
a second performance value calculator configured to calculate a second performance value based on said first partial process execution time and the upper limit executable time ratio; and
a selector configured to select either said first performance value or said second performance value as said performance value based on the upper limit executable time ratio, said first partial process execution time, and said second partial process execution time,
wherein said selector is further configured to calculate a value as a waiting time by subtracting said first partial process execution time from a value produced by dividing said first partial process execution time by the upper limit executable time ratio, and select said first performance value as said performance value if said waiting time is shorter than said second partial process execution time and select said second performance value as said performance value if said waiting time is longer than said second partial process execution time.

2. A performance evaluating apparatus for calculating a performance value representing the performance of an information processing apparatus for performing a requested process, the information processing apparatus having a first processor for performing a first process and a second processor for performing a second process, and the information processing apparatus being arranged such that for performing the requested process which includes a first partial process as said first process and a second partial process as said second process, said first processor performs said first process in a successive repetition of a first partial process execution time in which said first processor performs said first partial process and a second time in which said first processor does not perform said first partial process, so that an executable time ratio represented by a value produced by dividing said first partial process execution time by a value represented by the sum of said first partial process execution time and said second time is equal to or smaller than a predetermined upper limit executable time ratio, said performance evaluating apparatus comprising:
a first performance value calculator configured to calculate a first performance value based on said first partial process execution time in which said first processor performs said first partial process and a second partial process execution time in which said second processor performs said second partial process;
a second performance value calculator configured to calculate a second performance value based on said first partial process execution time and the upper limit executable time ratio; and
a selector configured to select either said first performance value or said second performance value as said performance value based on the upper limit executable time ratio, said first partial process execution time, and said second partial process execution time,
wherein said selector is further configured to calculate a value as a first partial process execution time ratio by dividing said first partial process execution time by a value represented by the sum of said first partial process execution time and said second partial process execution time, and select said first performance value as said performance value if said first partial process execution time ratio is smaller than the upper limit executable time ratio and select said second performance value as said performance value if said first partial process execution time ratio is greater than the upper limit executable time ratio.

3. A method of calculating a performance value representing the performance of an information processing apparatus for performing a requested process, the information processing apparatus having a first processor for performing a first process and a second processor for performing a second process, and the information processing apparatus being arranged such that for performing the requested process which includes a first partial process as said first process and a second partial process as said second process, said first processor performs said first process in a successive repetition of a first partial process execution time in which said first processor performs said first partial process and a second time in which said first processor does not perform said first partial process, so that an executable time ratio represented by a value produced by dividing said first partial process execution time by a value represented by the sum of said first partial process execution time and said second time is equal to or smaller than a predetermined upper limit executable time ratio, said method comprising:

- a first performance evaluating step of calculating a first performance value based on said first partial process execution time in which said first processor performs said first partial process and a second partial process execution time in which said second processor performs said second partial process;
- a second performance evaluating step of calculating a second performance value based on said first partial process execution time and the upper limit executable time ratio; and
- a selecting step of selecting either said first performance value or said second performance value as said performance value based on the upper limit executable time ratio, said first partial process execution time, and said second partial process execution time,
- wherein said selecting step calculates a value as a waiting time by subtracting said first partial process execution time from a value produced by dividing said first partial process execution time by the upper limit executable time ratio, and selects said first performance value as said performance value if said waiting time is shorter than said second partial process execution time and selects said second performance value as said performance value if said waiting time is longer than said second partial process execution time.

4. A method of calculating a performance value representing the performance of an information processing apparatus for performing a requested process, the information processing apparatus having a first processor for performing a first process and a second processor for performing a second process, and the information processing apparatus being arranged such that for performing the requested process which includes a first partial process as said first process and a second partial process as said second process, said first processor performs said first process in a successive repetition of a first partial process execution time in which said first processor performs said first partial process and a second time in which said first processor does not perform said first partial process, so that an executable time ratio represented by a value produced by dividing said first partial process execution time by a value represented by the sum of said first partial process execution time and said second time is equal to or smaller than a predetermined upper limit executable time ratio, said method comprising:

- a first performance evaluating step of calculating a first performance value based on said first partial process execution time in which said first processor performs said first partial process and a second partial process execution time in which said second processor performs said second partial process;
- a second performance evaluating step of calculating a second performance value based on said first partial process execution time and the upper limit executable time ratio; and
- a selecting step of selecting either said first performance value or said second performance value as said performance value based on the upper limit executable time ratio, said first partial process execution time, and said second partial process execution time,
- wherein said selecting step calculates a value as a first partial process execution time ratio by dividing said first partial process execution time by a value represented by the sum of said first partial process execution time and said second partial process execution time, and selects said first performance value as said performance value if said first partial process execution time ratio is smaller than the upper limit executable time ratio and selects said second performance value as said performance value if said first partial process execution time ratio is greater than the upper limit executable time ratio.

* * * * *